United States Patent
Kim et al.

(10) Patent No.: US 10,556,594 B2
(45) Date of Patent: Feb. 11, 2020

(54) ACCELERATION CONTROL METHOD FOR DCT VEHICLE

(71) Applicants: Hyundai Motor Company, Seoul (KR); Kia Motors Corporation, Seoul (KR)

(72) Inventors: Jin Sung Kim, Whasung-Si (KR); Dong Hyup Kang, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 70 days.

(21) Appl. No.: 16/030,613

(22) Filed: Jul. 9, 2018

(65) Prior Publication Data

US 2019/0202461 A1    Jul. 4, 2019

(30) Foreign Application Priority Data

Jan. 2, 2018    (KR) .......................... 10-2018-0000420

(51) Int. Cl.
*B60W 30/188*    (2012.01)
*B60W 10/06*    (2006.01)
*B60W 10/02*    (2006.01)

(52) U.S. Cl.
CPC .......... *B60W 30/188* (2013.01); *B60W 10/02* (2013.01); *B60W 10/06* (2013.01); *B60W 2510/0638* (2013.01); *B60W 2510/1015* (2013.01); *B60W 2540/10* (2013.01); *B60W 2710/021* (2013.01); *B60W 2710/025* (2013.01); *B60W 2710/0644* (2013.01)

(58) Field of Classification Search
None
See application file for complete search history.

(56) References Cited

U.S. PATENT DOCUMENTS

| | | | | |
|---|---|---|---|---|
| 4,432,445 A | * | 2/1984 | Windsor | ............... B60W 10/02 |
| | | | | 192/103 F |
| 5,630,773 A | * | 5/1997 | Slicker | .................. B60P 7/0807 |
| | | | | 477/176 |

(Continued)

FOREIGN PATENT DOCUMENTS

| | | |
|---|---|---|
| JP | 5847514 B2 | 1/2016 |
| KR | 10-1371745 B1 | 3/2014 |
| KR | 10-1393882 B1 | 5/2014 |

*Primary Examiner* — Dirk Wright
(74) *Attorney, Agent, or Firm* — Morgan, Lewis & Bockius LLP

(57) ABSTRACT

An acceleration control method for a dual clutch transmission (DCT) vehicle, may include determining whether an engine speed is lower than a desired shift stage input shaft speed by a controller when a driver's demand for acceleration is verified, determining whether an engine speed increased by the demand for acceleration is equal to or greater than the desired shift stage input shaft speed by the controller, feedback-controlling an engagement-side clutch to reduce a slip caused by a difference between the engine speed and the desired shift stage input shaft speed while maintaining an engine torque by the controller when the engine speed is verified to be equal to or greater than the desired shift stage input shaft speed, and completing control by verifying whether synchronization of the engine speed with the desired shift stage input shaft speed is stabilized.

11 Claims, 3 Drawing Sheets

(56) References Cited

U.S. PATENT DOCUMENTS

| | | | | |
|---|---|---|---|---|
| 6,364,813 B1 * | 4/2002 | Patel | ................... | F16D 48/08 |
| | | | | 477/174 |
| 6,767,311 B2 * | 7/2004 | Yoshikawa | ............. | F16D 48/08 |
| | | | | 477/174 |
| 6,790,159 B1 * | 9/2004 | Buchanan | ............... | F16D 48/06 |
| | | | | 477/174 |
| 6,881,171 B2 * | 4/2005 | Kuhstrebe | .............. | B60K 6/485 |
| | | | | 477/78 |
| 6,988,605 B2 * | 1/2006 | Senger | ................. | F16D 48/066 |
| | | | | 192/103 F |
| 7,188,017 B2 * | 3/2007 | Rodrigues | ............. | F16D 48/066 |
| | | | | 701/67 |
| 7,222,011 B2 * | 5/2007 | Smith | ................... | B60W 10/02 |
| | | | | 192/3.51 |
| 7,510,506 B2 * | 3/2009 | Kupper | ................ | B60W 10/06 |
| | | | | 477/180 |
| 8,321,108 B2 * | 11/2012 | Tona | ...................... | F16D 48/06 |
| | | | | 192/218 |
| 8,328,688 B2 * | 12/2012 | Fujii | .................... | F16H 61/061 |
| | | | | 477/155 |
| 8,352,109 B2 * | 1/2013 | Tsuda | ................... | F16H 61/061 |
| | | | | 701/22 |
| 8,825,325 B2 * | 9/2014 | Marcigliano | ......... | F16D 48/068 |
| | | | | 477/180 |
| 2004/0025612 A1 * | 2/2004 | Ahnert | ................ | B60W 10/02 |
| | | | | 74/329 |
| 2008/0195287 A1 * | 8/2008 | Janssen | ................. | F16D 48/06 |
| | | | | 701/67 |

* cited by examiner

ACCELERATION CONTROL METHOD FOR DCT VEHICLE

CROSS REFERENCE TO RELATED APPLICATION

The present application claims priority to Korean Patent Application No. 10-2018-0000420 filed on Jan. 2, 2018, the entire contents of which is incorporated herein for all purposes by this reference.

BACKGROUND OF THE INVENTION

Field of the Invention

The present invention relates to a method for controlling acceleration of a vehicle with a dual clutch transmission (DCT), and, more particularly, to a control technique for accelerating a vehicle in a state in which an engine speed is lower than a desired shift stage input shaft speed.

Description of Related Art

A vehicle with a DCT changes speed and a torque of power transmitted from an engine through two clutches and then provides the power to drive wheels. The two clutches are connected to respective input shafts in the DCT to implement shift stages assigned to each of the input shafts. The shift stages assigned to the two input shafts are typically divided into odd shift stages and even shift stages among a series of shift stages. One of the input shafts is configured to implement only odd shift stages and the other is configured to implement only even shift stages.

An upshift means that any shift stage is shifted to an upper shift stage. In the DCT, the execution of the upshift while the vehicle travels in an N shift stage which is a shift stage assigned to one input shaft means that the shift stage is shifted to an N+1 shift stage, which has a smaller gear ratio than the one of the N shift stage, assigned to the other input shaft.

In the instant case, the torque input from the engine may be decreased while the clutch connected to the input shaft to implement the N shift stage as a current shift stage is released, whereas the torque input from the engine may be increased while the clutch connected to the input shaft to implement the N+1 shift stage as a desired shift stage is engaged.

In the gear shifting, the clutch, which is released to decrease the torque input from the engine, is referred to as a "release-side clutch" and the input shaft connected thereto is referred to as a "release-side input shaft". The clutch, which is engaged to increase the torque input from the engine, is referred to as an "engagement-side clutch" and the input shaft connected thereto is referred to as an "engagement-side input shaft" or "desired shift stage input shaft".

In the case where a driver presses an accelerator pedal again with an intention of acceleration when the vehicle slows down while traveling, an engine torque is controlled to be forcibly reduced and then increased together with an engagement-side clutch torque to prevent an occurrence of impact when the engine speed becomes higher than the desired shift stage input shaft speed from a state that an engine speed is lower than a desired shift stage input shaft speed according to the demand for acceleration. Since the engine torque is reduced for a moment in such a case, the feeling of acceleration delay necessarily occurs in the vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an acceleration control method for a DCT vehicle, configured for improving a feeling of acceleration in a vehicle with a DCT by preventing an acceleration delay, securing a rapid response, and preventing an occurrence of impact when a driver intends to accelerate the vehicle in a state in which the engine speed of the vehicle is lower than a desired shift stage input shaft speed.

In accordance with an aspect of the present invention, an acceleration control method for a DCT vehicle may include determining whether an engine speed is lower than a desired shift stage input shaft speed by a controller when a driver's demand for acceleration is verified, determining whether an engine speed increased by the demand for acceleration when the engine speed is lower than the desired shift stage input shaft speed is equal to or greater than the desired shift stage input shaft speed by the controller, feedback-controlling an engagement-side clutch to reduce a slip caused by a difference between the engine speed and the desired shift stage input shaft speed while maintaining an engine torque by the controller when the engine speed is verified to be equal to or greater than the desired shift stage input shaft speed in the determining whether an engine speed increased by the demand for acceleration when the engine speed is lower than the desired shift stage input shaft speed is equal to or greater than the desired shift stage input shaft speed, and completing control by verifying whether synchronization of the engine speed with the desired shift stage input shaft speed is stabilized.

In the determining whether an engine speed is lower than a desired shift stage input shaft speed, an accelerator pedal sensor may be changed from OFF to ON to verify the driver's demand for acceleration, and the engine speed when a signal of the accelerator pedal sensor is turned on may be compared with the desired shift stage input shaft speed.

The acceleration control method may further include verifying whether the engine speed equal to or greater than the desired shift stage input shaft speed is stably secured before the feedback-controlling an engagement-side clutch after the determining whether an engine speed increased by the demand for acceleration when the engine speed is lower than the desired shift stage input shaft speed is equal to or greater than the desired shift stage input shaft speed.

In the verifying whether the engine speed equal to or greater than the desired shift stage input shaft speed is stably secured, when the engine speed is equal to or greater than a predetermined reference upper limit speed higher than the desired shift stage input shaft speed, it may be determined that the engine speed equal to or greater than the desired shift stage input shaft speed is stably secured.

In the verifying whether the engine speed equal to or greater than the desired shift stage input shaft speed is stably secured, when a holding time, at which the engine speed is maintained between a predetermined reference upper limit speed higher than the desired shift stage input shaft speed and a predetermined reference lower limit speed lower than the desired shift stage input shaft speed, is equal to or greater than a predetermined reference time, it may be determined that the engine speed equal to or greater than the desired shift stage input shaft speed is stably secured.

When the driver's demand for acceleration is verified in a state in which the engine speed is lower than the desired shift stage input shaft speed in the determining whether an engine speed is lower than a desired shift stage input shaft speed, the controller may gradually increase an engagement-side clutch torque according to a difference between an engine torque and a clutch torque and an accelerator pedal sensor signal until the feedback-controlling an engagement-side clutch initiates.

When the engagement-side clutch torque is gradually increased until the feedback-controlling an engagement-side clutch initiates, the engagement-side clutch torque may be determined by the following equation:

Engagement-side clutch torque $(k)$=engagement-side clutch torque $(k-1)$+A torque $(k)$, and a torque $(k)=f$(engine torque $(k-1)$-engagement-side clutch torque $(k-1)$, APS signal).

As apparent from the above description, the present invention can improve a feeling of acceleration in a vehicle with a DCT by preventing an acceleration delay, securing a rapid response, and preventing an occurrence of impact when a driver intends to accelerate the vehicle in a state in which the engine speed of the vehicle is lower than a desired shift stage input shaft speed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
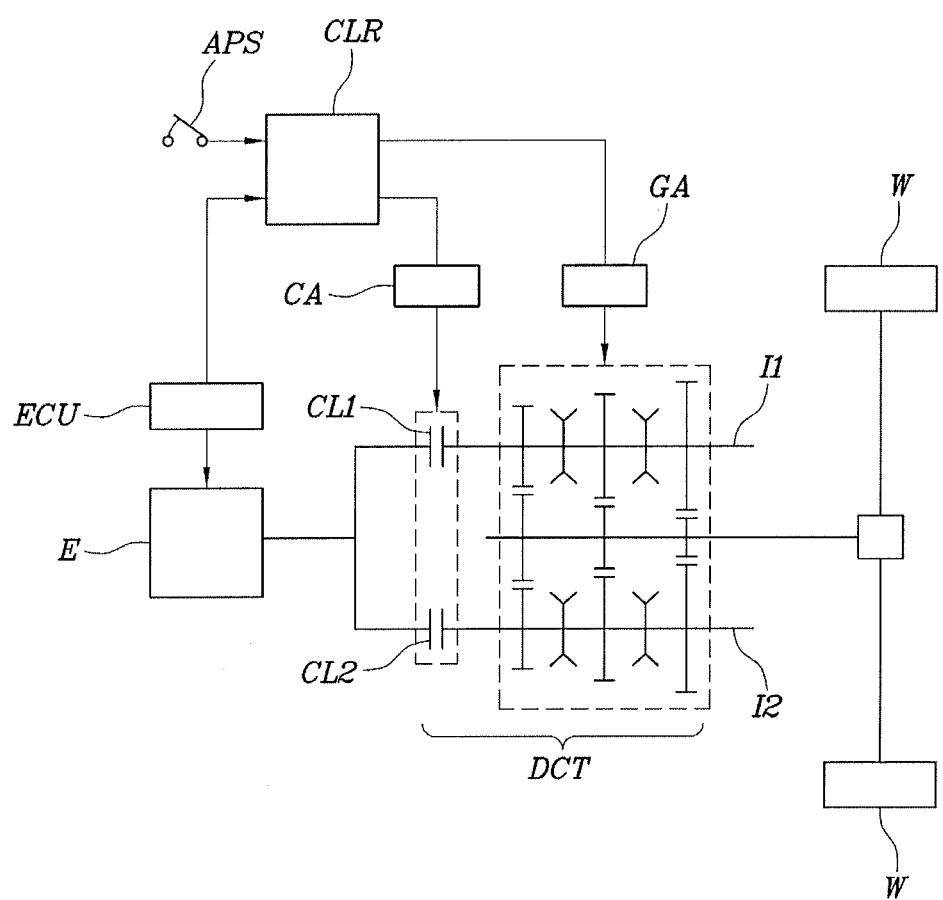
FIG. 1 is a diagram illustrating a configuration of a DCT vehicle to which the control method of the present invention is applicable.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made more specifically to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

An acceleration control method for a DCT vehicle according to the exemplary embodiments of the present invention will be described below with reference to the accompanying drawings.

FIG. 1 illustrates a configuration of a DCT vehicle to which the present invention is applicable. In the vehicle, the power of an engine E is selectively provided to two input shafts I1 and I2 through two clutches CL1 and CL2 of a DCT, and speed and torque of the power are changed in the DCT and then provided to drive wheels W.

A controller CLR is connected to an engine control unit (ECU) to receive information such as an engine torque and request a torque reduction to the engine E. The controller CLR is configured to control a clutch actuator CA for controlling two clutches of the DCT and a gear actuator GA for changing the gear engagement in the DCT.

The controller CLR is configured to receive a signal from an accelerator pedal sensor (APS) and to receive a rotation speed of each input shaft I1 or I2 of the DCT.

The two clutches may be divided into a clutch used to implement a current shift stage and a clutch used to implement a new desired shift stage during gear shifting. Hereinafter, the clutch, which is released according to the progression of gear shifting while implementing the current shift stage, is referred to as a "release-side clutch", whereas the clutch, which is gradually engaged to implement the desired shift stage, is referred to as an "engagement-side clutch".

Furthermore, according to the division of the clutch, the input shaft, which is connected to the release-side clutch, is referred to as a "release-side input shaft", whereas the input shaft, which is connected to the engagement-side clutch, is referred to as an "engagement-side input shaft".

Furthermore, in the following description, the term "desired shift stage input shaft speed" means a rotation speed of an input shaft used to implement a desired shift stage when the gears in the desired shift stage are engaged, and the desired shift stage input shaft speed is equal to an engagement-side input shaft speed.

Figure 2:
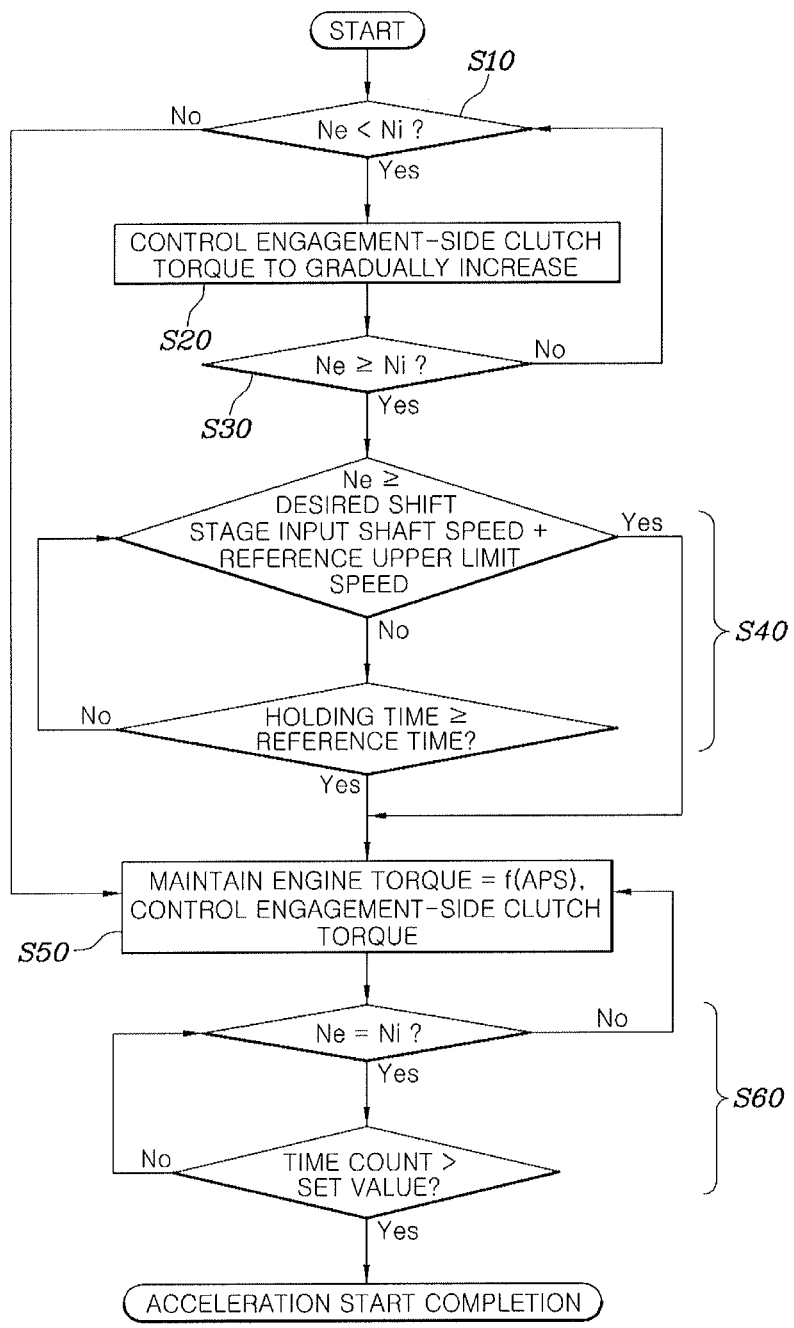
FIG. 2 is a flowchart illustrating an acceleration control method for a DCT vehicle according to an exemplary embodiment of the present invention.
Figure 3:
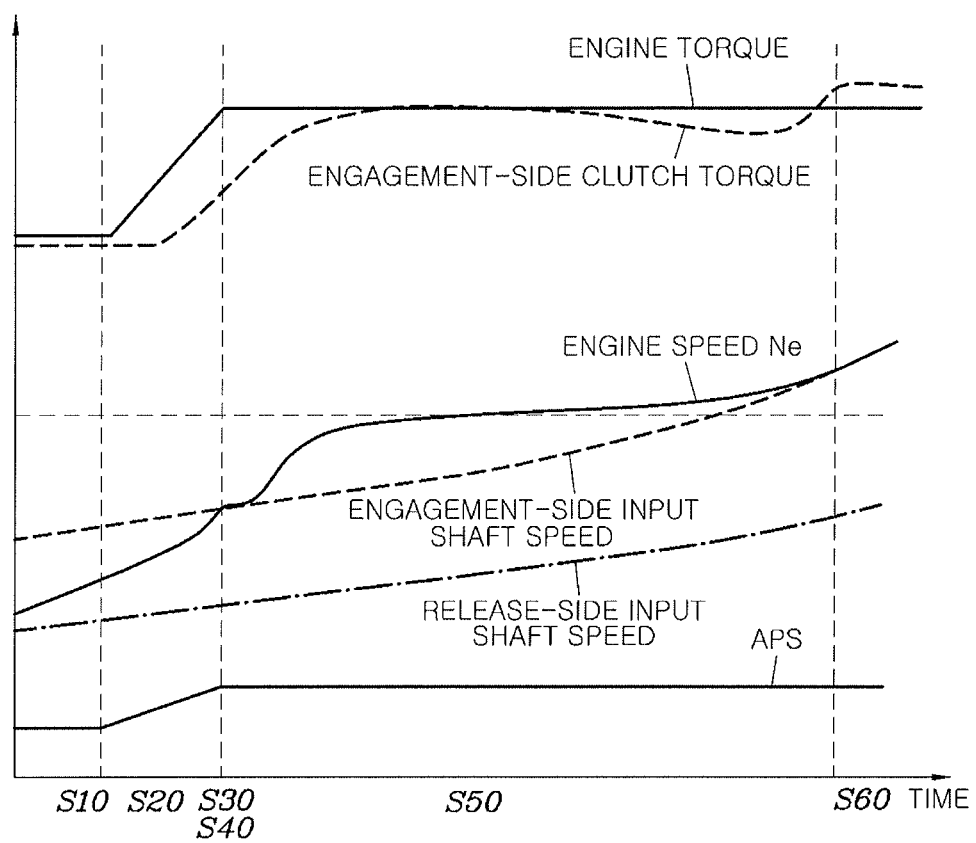
FIG. 3 is a graph for explaining the control method according to the exemplary embodiment of the present invention.

Referring to FIG. 2, an acceleration control method for a DCT vehicle according to an exemplary embodiment of the present invention includes an acceleration situation determination step S10 of determining whether an engine speed Ne is lower than a desired shift stage input shaft speed Ni by a controller CLR when a driver's demand for acceleration is verified, a speed-reaching determination step S30 of determining whether an engine speed increased by the demand for acceleration when the engine speed is lower than the desired shift stage input shaft speed is equal to or greater than the desired shift stage input shaft speed by the controller, a synchronization step S50 of feedback-controlling an engagement-side clutch to reduce a slip caused by the difference between the engine speed and the desired shift stage input shaft speed while maintaining an engine torque by the controller when the engine speed is verified to be equal to or greater than the desired shift stage input shaft speed in the speed-reaching determination step S30, and an acceleration start completion step S60 of completing the control by verifying whether the synchronization of the engine speed with the desired shift stage input shaft speed is stabilized.

In the acceleration situation determination step S10, an accelerator pedal sensor is changed from OFF to ON to verify the driver's demand for acceleration, and the engine speed when the signal of the accelerator pedal sensor is turned on is compared with the desired shift stage input shaft speed, to determine whether the engine speed is lower than the desired shift stage input shaft speed.

When the driver's demand for acceleration is verified in the state in which the engine speed is lower than the desired shift stage input shaft speed in the acceleration situation determination step S10, the controller performs a clutch torque increase step S20 of gradually increasing an engagement-side clutch torque according to the difference between an engine torque and a clutch torque and the signal of the accelerator pedal sensor until the synchronization step S50 initiates.

In the instant case, the engagement-side clutch torque may be determined by the following equation:

>    Engagement-side clutch torque ($k$)=engagement-side clutch torque ($k-1$)+Δ torque ($k$), and torque ($k$)=$f$(engine torque ($k-1$)−engagement-side clutch torque ($k-1$), APS signal), where $k$ is a control cycle index of a controller, $k$ means a current control cycle and $k-1$ means a previous control cycle.

That is, the engagement-side clutch torque is controlled to gradually increase. The increase of the engagement-side clutch torque is adjusted according to the difference between an engine torque and a clutch torque in the previous control cycle and the amount of driver's accelerator pedal operation indicated by APS signals. This is determined using a map, which is previously prepared by many experiments and analyses, or a set function relation such that the engine speed is increased as rapid as possible by the driver's accelerator pedal operation and the engagement-side clutch torque is increased without causing impact.

Accordingly, if the engine speed is lower than the desired shift stage input shaft speed when the APS signal is changed from OFF to ON as in the case where the driver presses the accelerator pedal to accelerate the vehicle while the vehicle slows down, the method of the present invention begins to immediately increase the engagement-side clutch torque, instead of performing the control that forcibly decreases an engine torque and then increase the engine torque together with an engagement-side clutch torque in the state in which the engagement-side clutch torque is not increased until an engine speed exceeds a desired shift stage input shaft speed as in the related art. On the other hand, if the engine speed is equal to or greater than the desired shift stage input shaft speed, the method of the present invention performs the full engagement of the engagement-side clutch by reducing the slip while maintaining the engine torque, to transfer a more amount of engine torque to drive wheels in faster time, preventing an acceleration delay of the vehicle and securing a rapid acceleration response.

In the present embodiment, the method further includes a speed stabilization check step S40 of verifying whether the engine speed equal to or greater than the desired shift stage input shaft speed is stably secured before the synchronization step S50 after the speed-reaching determination step S30.

In the speed stabilization check step S40, when the engine speed is equal to or greater than a predetermined reference upper limit speed higher than the desired shift stage input shaft speed, it may be determined that the engine speed equal to or greater than the desired shift stage input shaft speed is stably secured.

Here, the reference upper limit speed is previously determined by experiments and analyses suitable for the purpose. For example, the reference upper limit speed may be set as 50 RPM.

In the speed stabilization check step S40, when the holding time, at which the engine speed is maintained between a predetermined reference upper limit speed higher than the desired shift stage input shaft speed and a predetermined reference lower limit speed lower than the desired shift stage input shaft speed, is equal to or greater than a predetermined reference time, it may be determined that the engine speed equal to or greater than the desired shift stage input shaft speed is stably secured.

That is, if the engine speed is not equal to or greater than the reference upper limit speed higher than the desired shift stage input shaft speed, but the holding time, at which the engine speed is maintained between the reference upper limit speed higher than the desired shift stage input shaft speed and the reference lower limit speed lower than the desired shift stage input shaft speed, is equal to or greater than the reference time, it may be seen that the engine speed is stably increased. Therefore, in such a case, it is determined that the engine speed is stably increased to proceed to the synchronization step S50.

Accordingly, the reference upper limit speed and the reference lower limit speed may be determined to have an appropriate value by experiments and analyses suitable for the purpose. For example, the reference upper limit speed and the reference lower limit speed may be set as 50 RPM and −50 RPM, respectively.

For reference, two examples in which the speed stabilization step S40 is performed are used in the present embodiment.

In the synchronization step S50, the engine torque is maintained as a torque determined by the APS and it is not forcibly decreased as in the related art. Furthermore, the engagement-side clutch torque is controlled to gradually reduce the slip caused by the difference the engine speed and the desired shift stage input shaft speed. Therefore, it is possible to decide a desired change rate of slip and thus implement the engagement-side clutch torque in a feedback control manner such that the slip is gradually reduced.

In the acceleration start completion step S60, when the count of times accumulated while the synchronization of the engine speed with the desired shift stage input shaft speed is repeated for the control cycle exceeds a predetermined value, it is determined that the synchronization is stable so that the control of the present invention is completed.

The set value is preferably set as a value suitable to securely determine that the synchronization of the engine speed with the desired shift stage input shaft speed is stably maintained by sufficiently increasing the engagement-side clutch torque.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An acceleration control method for a dual clutch transmission (DCT) vehicle, comprising:
   determining, by a controller, whether an engine speed is lower than a target shift stage input shaft speed when a driver's demand for acceleration is verified;
   determining, by the controller, whether the engine speed increased by a demand for acceleration when the engine speed is lower than the target shift stage input shaft speed, is equal to or greater than the target shift stage input shaft speed;
   feedback-controlling, by the controller, an engagement-side clutch to reduce a slip caused by a difference between the engine speed and the target shift stage input shaft speed while maintaining an engine torque when the engine speed is verified to be equal to or greater than the target shift stage input shaft speed in the determining of whether the engine speed increased by the demand for acceleration when the engine speed is lower than the target shift stage input shaft speed is equal to or greater than the target shift stage input shaft speed; and
   completing control of the engagement-side clutch, by the controller, when the controller verifies that synchronization of the engine speed with the target shift stage input shaft speed is stabilized.

2. The acceleration control method according to claim 1, wherein, in the determining of whether the engine speed is lower than the target shift stage input shaft speed, an accelerator pedal sensor is changed from OFF to ON to verify the driver's demand for acceleration, and the engine speed when a signal of the accelerator pedal sensor is turned on is compared with the target shift stage input shaft speed.

3. The acceleration control method according to claim 1, further including verifying, by the controller, whether the engine speed equal to or greater than the target shift stage input shaft speed is stably secured before the feedback-controlling the engagement-side clutch after the determining whether the engine speed increased by the demand for acceleration when the engine speed is lower than the target shift stage input shaft speed is equal to or greater than the target shift stage input shaft speed.

4. The acceleration control method according to claim 3, wherein, in the verifying whether the engine speed equal to or greater than the target shift stage input shaft speed is stably secured, the controller determines that the engine speed equal to or greater than the desired shift stage input shaft speed is stably secured, when the engine speed is equal to or greater than a predetermined reference upper limit speed higher than the target shift stage input shaft speed.

5. The acceleration control method according to claim 4, wherein, in the verifying whether the engine speed equal to or greater than the target shift stage input shaft speed is stably secured, the controller determines that the engine speed equal to or greater than the target shift stage input shaft speed is stably secured, when a holding time, at which the engine speed is maintained between the predetermined reference upper limit speed higher than the target shift stage input shaft speed and a predetermined reference lower limit speed lower than the target shift stage input shaft speed, is equal to or greater than a predetermined reference time.

6. The acceleration control method according to claim 5, wherein the predetermined reference upper limit speed and the predetermined reference lower limit speed are 50 rpm and −50 rpm, respectively.

7. The acceleration control method according to claim 3, wherein, in the verifying whether the engine speed equal to or greater than the target shift stage input shaft speed is stably secured, the controller verifies that the engine speed equal to or greater than the target shift stage input shaft speed is stably secured when a holding time, at which the engine speed is maintained between a predetermined reference upper limit speed higher than the target shift stage input shaft speed and a predetermined reference lower limit speed lower than the target shift stage input shaft speed, is equal to or greater than a predetermined reference time.

8. The acceleration control method according to claim 7, wherein the predetermined reference upper limit speed and the predetermined reference lower limit speed are 50 rpm and −50 rpm, respectively.

9. The acceleration control method according to claim 1, wherein, when the driver's demand for acceleration is verified in a state in which the engine speed is lower than the target shift stage input shaft speed in the determining of whether the engine speed is lower than the target shift stage input shaft speed, the controller is configured to increase a torque of the engagement-side clutch according to a difference between an engine torque and a clutch torque and an accelerator pedal sensor signal until the feedback-controlling the engagement-side clutch initiates.

10. The acceleration control method according to claim 9, wherein, when the torque of the engagement-side clutch is increased until the feedback-controlling the engagement-side clutch initiates, the torque of the engagement-side clutch is determined by the following equation:

engagement-side clutch torque $(k)$=engagement-side clutch torque $(k-1)$+Δ torque $(k)$, and Δ torque $(k)$=$f$(engine torque $(k-1)$−engagement-side clutch torque $(k-1)$, APS signal).

11. The acceleration control method according to claim 1, wherein in completing the control of the engagement-side clutch, the controller is configured to determine that the synchronization is stable when count of times accumulated while the synchronization of the engine speed with the target shift stage input shaft speed is repeated for a predetermined control cycle exceeds a predetermined value.

\* \* \* \* \*